United States Patent [19]
Richard et al.

[11] 3,831,375
[45] Aug. 27, 1974

[54] PILOTING FLAMEHOLDER FOR JET ENGINE

[75] Inventors: Clyde C. Richard, Vernon; Alexander Vranos, Rockville, both of Conn.

[73] Assignee: United Aircraft Corporation, East Hartford, Conn.

[22] Filed: Apr. 7, 1967

[21] Appl. No.: 632,143

[52] U.S. Cl................ 60/39.72, 60/39.74, 60/39.82
[51] Int. Cl............................................... F02g 1/00
[58] Field of Search........................ 60/39.72, 39.82

[56] References Cited
UNITED STATES PATENTS

| | | | |
|---|---|---|---|
| 2,417,445 | 3/1947 | Pinkel | 60/39.72 |
| 2,520,388 | 8/1950 | Earl | 60/39.72 |
| 2,592,110 | 4/1952 | Berggren et al. | 60/39.72 |
| 2,744,384 | 5/1956 | Loughran | 60/39.72 |
| 2,861,420 | 11/1958 | Lewis | 60/243 |
| 3,022,630 | 2/1962 | McCollum | 60/39.72 |

FOREIGN PATENTS OR APPLICATIONS

| 386,320 | 4/1908 | France | 60/39.82 |
|---|---|---|---|

*Primary Examiner*—Samuel Feinberg
*Attorney, Agent, or Firm*—Charles A. Warren

[57] ABSTRACT

An annular duct for use primarily in jet propulsion devices in which igniting and flameholding means are incorporated to form a combustion space. This is accomplished by providing an annular wall within the air stream, the wall containing a downstream facing stepped formation. The stepped formation provides a combustion space and additionally contains means for supplying a fuel and oxidant to the combustion space thereby providing a pilot flame.

3 Claims, 2 Drawing Figures

PATENTED AUG 27 1974  3,831,375

INVENTORS
CLYDE C. RICHARD, JR.
ALEXANDER VRANOS

BY Charles A Warren
ATTORNEY

PILOTING FLAMEHOLDER FOR JET ENGINE

The invention herein described was made in the course of or under a contract or subcontract thereunder with the Department of the Air Force.

BACKGROUND OF THE INVENTION

This invention relates to a piloting flameholder for an annular combustion chamber formed in an annular duct through which a high velocity stream of air flows, and the invention is particularly adapted to be operable even when the flow is above sonic speed.

The conventional flameholder is a blunt obstacle such as a V-gutter placed in the airstream to decelerate the flow locally. These devices lead to prohibitive pressure losses at velocities above that of sound.

SUMMARY OF INVENTION

One feature of the invention is an efficient flameholder that is placed out of the mainstream but that will be operable over wide operating conditions.

Another feature is a combined pilot and flameholder in which the piloting flame is self-adjusting to the flow through the duct and is also relatively insensitive to the fuel flow and the fuel and oxidant ratio delivered to the pilot nozzles.

In accordance with the invention the duct having opposed walls between which there is a high velocity airflow is provided with a combustion space by forming a step in one of said walls, the step facing downstream, and a pilot flame is formed just downstream of the step by delivering fuel and oxidant into the duct through rows of nozzles at the step. The main fuel is delivered through nozzles downstream of the pilot nozzles and in the same wall.

DESCRIPTION OF THE PREFERRED EMBODIMENT

Figure 1:
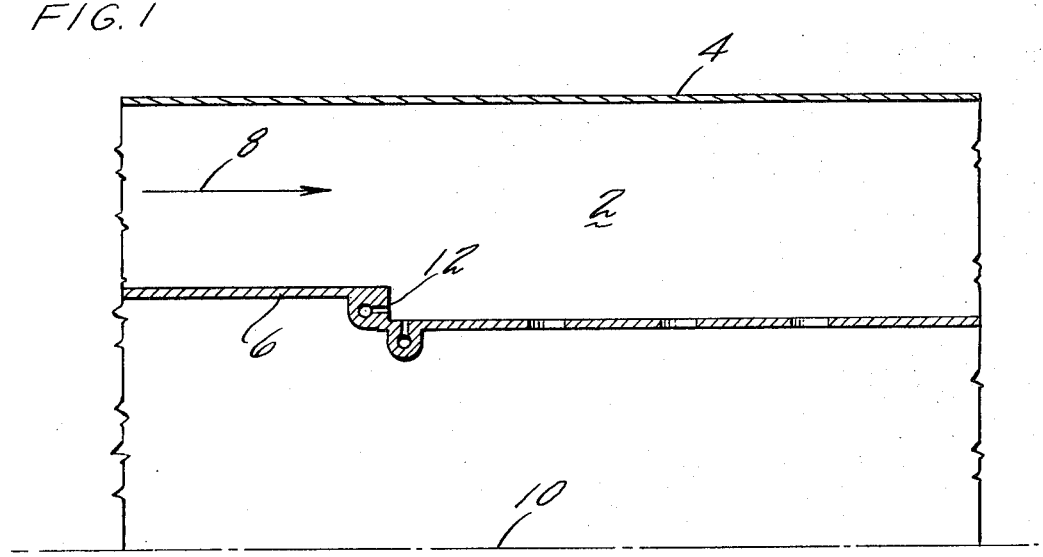
FIG. 1 is a longitudinal sectional view through the duct.
Figure 2:
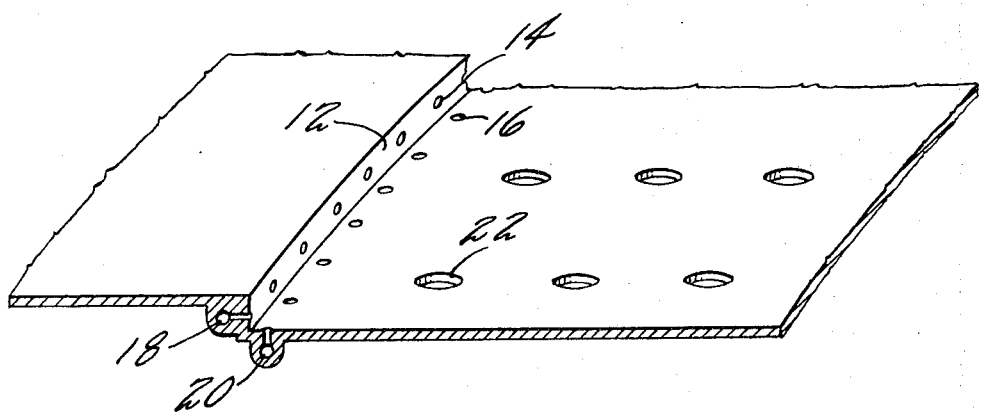
FIG. 2 is a fragmentary perspective view showing the step in one wall and the arrangement of nozzles with respect thereto.

The invention is shown as an annular duct 2 having an outer wall 4 and an inner wall 6. This duct may form a part of an afterburner duct for a jet engine or it may be the combustion area of an annular duct in a ram jet engine. It is sufficient to note for the purpose of the invention that the flow of air through the duct is in the direction of the arrow 8 and that this flow may be either subsonic or supersonic. Thus the piloted flameholder would be effective to accommodate itself to flow below or above the speed of sound. The walls 4 and 6 are annular about an axis 10. The inner wall 6 has a step 12 therein facing in a downstream direction thereby forming an abrupt increase in the transverse dimension of the duct at this point.

In the step of the duct there are a plurality of fuel nozzles through which pilot fuel is delivered to the duct immediately downstream of the step. Oxidant nozzles 16 are located in the wall 6 closely adjacent to the step and downstream thereof. The nozzles 14 may all be supplied from a manifold 18 and the nozzles 16 from a manifold 20. It is preferred to use hydrogen as the fuel in which event the nozzles have discharge openings of about 0.040 inches and these holes are spaced apart peripherally at a distance no greater than 0.40 inches. Oxygen may be used as the oxidant and in this event the discharge openings for the nozzles 16 for the oxygen are about 0.015 inches in diameter. The holes 14 and 16 are preferably equal in number and are opposed holes. They are preferably located in the same longitudinal plane so that the hydrogen and oxygen from the respective nozzles are intermixed. Downstream of the step 12 are one or more rows of main fuel nozzles 22, the first row of nozzles being spaced approximately two inches from the step and the other rows spaced apart in a downstream direction preferably at no greater distances. The height of the step is preferably at least 0.1 inch and may be substantially higher. Suitable igniting means, not shown, are provided for igniting the mixture of hydrogen and oxygen from the piloting nozzles and the circumferential spacing of the holes is such that the igniting mixture will be ignited for the entire circumference of the combustion chamber.

It has been found that with an arrangement of this character the piloting mixture will ignite readily and will assure ignition of the main fuel over wide operating conditions. It has been found that the device will operate without heating of the main fuel or pilot fuel and oxidant and that the piloting flameholder is respectively insensitive to the quantity of the main fuel being delivered.

The flameholder has been operated successfully with an air stream $M_n = 1.4$ and a static temperature of the air of 330°F. The main fuel temperature was 70°F. Under the same air speed conditions it was found that steady combustion would occur effectively with no oxygen supply with the static air temperature above 500°F. The device has operated with an air stream $M_n$ as high as 3.0.

We claim:

1. An annular combustion duct having inner and outer annular walls defining the duct through which a stream of air passes at high speed during operation, the inner wall having a step formed therein to produce a sudden increase in the spacing of the walls in a downstream direction, the wall containing the step being positioned in the stream so that the stream passes thereover, the step extending around the entire circumference of the inner wall and forming in effect a flameholder around the entire circumference, at least one circumferential row of main fuel nozzles in said one of said walls downstream of said step, and a row of pilot fuel nozzles and a row of pilot oxidant nozzles located one in the face of the step and the other closely spaced downstream of the step, said pilot oxidant and fuel nozzles being closely enough spaced to produce a continuous pilot flame for the entire length of the step.

2. An annular combustion duct as in claim 1 in which the pilot fuel is $H_2$, the oxidant is $O_2$ and the ratio of the $H_2$ hole diameter to the $O_2$ hole diameter is about 8 to 3.

3. An annular combustion duct as in claim 2 in which the step is at least about one-tenth inch high, and the pilot nozzles in each row are spaced apart less than four-tenths of an inch.

* * * * *